Figure 1:
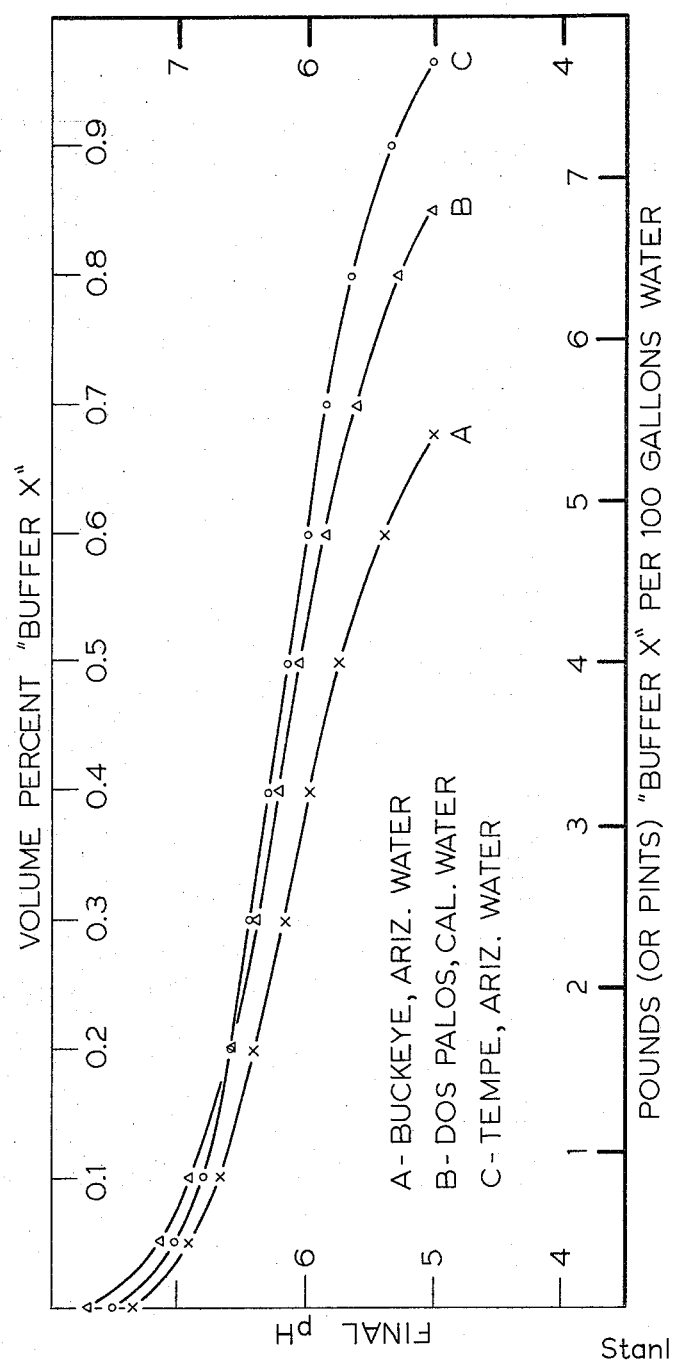

INVENTOR.
STANLEY M. WOOGERD
BY Eckhoff and Slick
ATTORNEYS

United States Patent Office 3,244,502
Patented Apr. 5, 1966

3,244,502
AGRICULTURAL SPRAY ADJUVANT
Stanley M. Woogerd, Corte Madera, Calif., assignor to Hercules Glue Company, Ltd., a corporation of California
Filed Sept. 29, 1964, Ser. No. 402,985
2 Claims. (Cl. 71—2.4)

This invention relates in general to adjuvants for agricultural sprays and more particularly to adjuvants having a wetting and buffering action. This application is a continuation-in-part of my application Ser. No. 285,045, filed June 3, 1963, and now abandoned.

Agricultural chemicals such as fungicides, acaricides, insecticides, nematicides, herbicides, and defoliants are ordinarily sold in the form of dispersible powders, solutions or emulsions, wherein the toxicant is combined with one or more dispersants, wetting agents or emulsifying agents, so that the compounded material can be diluted with a large volume of water and applied to the crop.

Frequently the water which is used to dilute such agricultural chemicals is somewhat alkaline and contains large quantities of dissolved alkaline salts. Under these conditions, the water interferes with good emulsification and dispersion. Further, compounded agricultural chemicals cannot contain the optimum amount of wetting or spreading agents since, in most instances, the optimum wetting and spreading agents are incompatible with the ingredients of an emulsifiable concentrate or dispersible powder when incorporated directly into the concentrate formulation, and furthermore, the optimum amount of the wetting or dispersing agent must be based on the amount of water present. Agricultural chemicals are ordinarily diluted to give the desired biocide concentrations in terms of quantity per acre, rather than in terms of quantity per gallon of water. For instance, eight ounces of a common pesticide such as Phosdrin might be applied in 5 to 10 gallons of water if applied by aircraft, in 20 to 40 gallons of water if applied by high-pressure ground equipment, and in 500 to 1000 gallons of water if applied by an orchard sprayer. The adjuvant of the present invention does not in any manner replace the adjuvants which are added by the manufacturer to compounded agricultural chemicals, but rather, is an adjuvant which is added to treat the water in which the compounded agricultural chemicals are to be dispersed. The adjuvant of the present invention is thus a spray tank additive which provides for the buffering of alkaline waters, for a buffered environment on plant surfaces, and acts as an aid in wetting, spreading or deposit, penetration of the plant cuticle, and in the translocation of systemic biocides. Further, as will hereinafter appear, the adjuvant of the present invention markedly increases the effect of many agricultural chemicals and oftentimes increases the effectiveness of the agricultural chemical on the order of 50% or even more.

It is therefore an object of this invention to provide a composition serving as both a buffer and a surfactant for use with compounded agricultural sprays.

It is a further object of this invention to provide a buffering adjuvant for an agricultural spray which, when dissolved in water, effectively maintains the pH thereof in the range 5.5–6.5.

Still another object of this invention is to provide a buffering agent which is capable of reducing the pH of water to within the aforementioned range and maintaining it within prescribed limits and which also acts as a "conditioning agent" with respect to alkaline metal salts in water.

It is a further object of this invention to provide an agricultural spray adjuvant which demonstrates a wetting action and which increases the rate of penetration of a toxic agent into a plant or body of an insect.

Further objects and advantages of this invention, if not specifically set forth, will become apparent during the course of the description which follows.

The exact wetting and dispersing agents which are used in various commercial agricultural chemicals are ordinarily closely-guarded company secrets, so that it is not possible to specify in each instance the exact formulation of the commercial pesticides. However, it can be generally stated that the pesticides are commonly dispersed with the aid of well known commercial dispersants. Thus, in the case of organic materials which are destined for emulsification with water, anionic dispersants such as calcium dodecyl benzene sulfonate, or non-ionic dispersants such as octyl phenoxypolyoxyethylene glycol with from 3 to 7 moles of ethylene oxide per molecule might be used. Both anionic and non-ionic dispersants might be used in ratios determined by the nature of the toxicant. In some instances, the organic material may be dissolved in a mutual solvent such as an ordinary petroleum fraction such as kerosene, or an aromatic solvent of the xylene type. Heavy aromatic naphthas are frequently used for this purpose. In the case of dispersible powders, various wetting agents such as sodium lauryl sulfate or other sulfated alcohols might be used as well as lignin sulfonate, a chemical pulp byproduct. In the case of water soluble toxicants, solvents such as alcohols, glycerine, glycol and glycol ethers may be employed.

The adjuvant of the present invention is useful with all of the above types of wetting and dispersing agents found in compounded agricultural toxicants, and it is not necessary for the operator to know the nature of the emulsifier or dispersant in order to utilize the adjuvant of the present invention.

Preferably the adjuvant of the present invention is added to the water before the toxicant is dispersed therein, although the toxicant can be dispersed first and then the composition of the present invention added thereto.

Generally, it has been found that an effective agricultural spray adjuvant is a composition consisting of between about 30 and 50 weight percent of a mixture of mono and diorthophosphoric acid esters of nonyl phenoxy polyoxyethylene glycol having 9–10 moles of ethylene oxide (such as Gafac RE–610), between about 5 and 20 weight percent of a nonyl phenoxy polyoxyethylene glycol having 9–10 moles of ethylene oxide (such as Igepal CO–630), between about 1 and 3 weight percent orthophosphoric acid, between about 15 and 25 weight percent isopropyl alcohol, between about 18 and 29 weight percent water and between about 1 and 3 weight percent oleic acid with such quantities of dye and scent creating material as may be desired. This composition is dissolved or carried in water together with the acaricide, fungicide, insecticide, herbicide or defoliant. The composition is preferably used in the quantity of between about 1 and 8 pounds per 100 gallons of water and preferably from 2 to 4 pounds per 100 gallons. Stated in a somewhat more general form, the invention contemplates the use of between about 0.1 weight percent and 1.2 weight percent of the aforementioned composition in a water carrier. A preferred composition is as follows:

| Compound: | Weight percent |
| --- | --- |
| Gafac RE–610 | 43.7 |
| Igepal CO–630 | 10.4 |
| $H_3PO_4$ (85%) | 2.9 |
| Isopropyl alcohol | 15.6 |
| Water | 25.6 |
| Oleic acid | 1.8 |

In the drawings:

FIGURE 1 illustrates the buffering effect of various amounts of the composition above mentioned (designated in the figure "Buffer-X") when added in the amounts indicated to the alkaline waters at various locales in Arizona and California. The effect of the composition in lowering the pH below 7 and in maintaining the pH within the range 5.5–6.5 over wide quantity variations is apparent from the figure.

Figure 2:
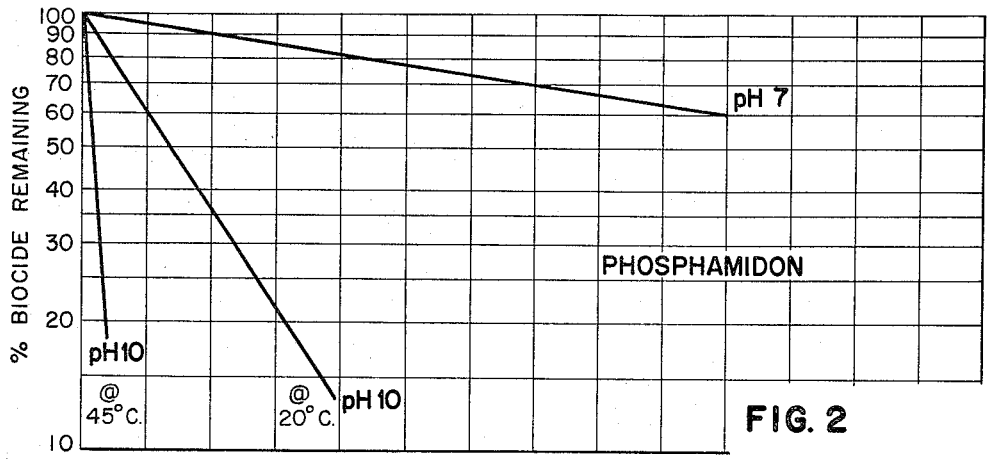
Figure 3:
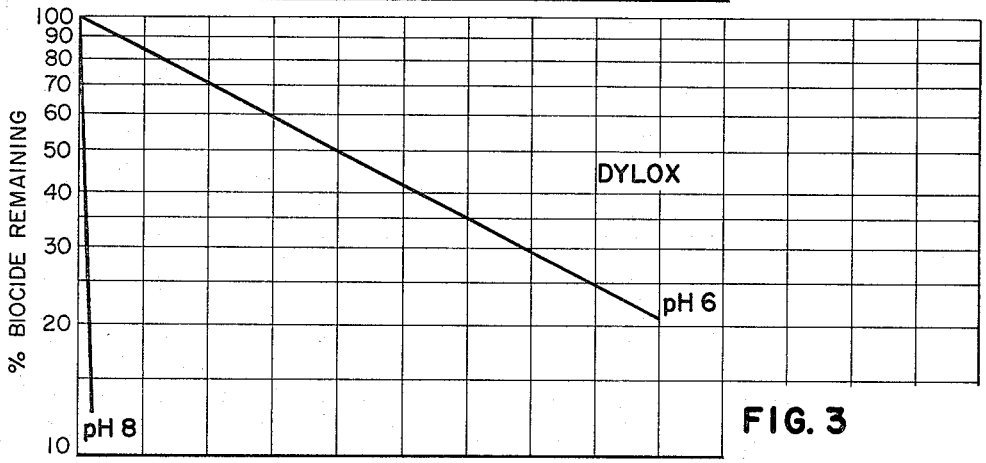
Figure 4:
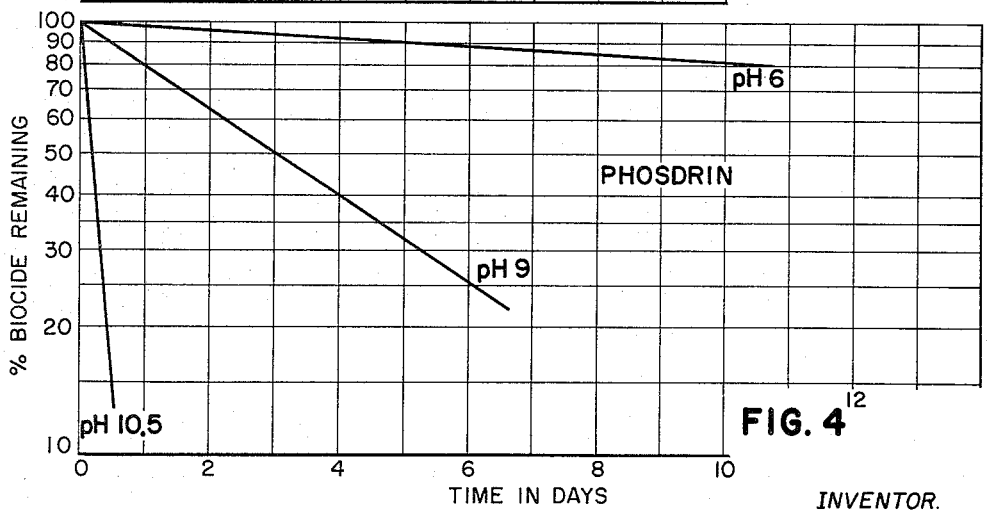

FIGURES 2, 3 and 4 show, respectively, the effect of pH on the storage stability of the well known pesticides Phosphamidon, 2-chloro-2-diethylcarbamoyl-1-methylvinyl dimethylphosphate; Dylox, dimethyl (2,2,2-trichloro-1-hydroxyethyl phosphonate; and Phosdrin, 2-methoxycarbonyl-1-methyl vinyl dimethly phosphate, respectively. It will be seen that in each instance high alkalinity results in a very short life and that the life can be greatly extended by lowering the pH.

The quantity of compounded pesticide, etc., per 100 gallons of water will be that recommended by the manufacturer and the application rate per acre similarly will vary depending upon the manufacturer's recommendations.

Examples are set forth below for illustrative purposes, but these are not to be interpreted as imposing limitations on the scope of the invention other than as set forth in the appended claims.

*Example I.*—In a series of tests involving the defoliation of cotton, a series of plots were prepared having rows each approximately one-half mile long. The defoliant was a commercial formulation containing as its active ingredient S,S,S-tributyl phosphoro trithioate; it was used in a quantity of 2.75 pounds per acre in 35 gallons of water. The adjuvant Buffer-X was added in the quantity of 4 pints (or approximately 4 pounds) per 100 gallons of water. The results of this material were compared with a similar plot treated with the same defoliant except that the Buffer-X was omitted. It was found that the plot without Buffer-X had only 25% open bolls and 40% defoliation, while the plot with Buffer-X had from 75 to 80% open bolls and 85 to 90% defoliation.

*Example II.*—An insecticidal mixture was prepared from a commercial compounded insecticide sold under the name Sevin Sprayable, having as its active ingredient 1-naphthyl-N-methyl-carbamate. This was prepared at the rate of 3 pounds per 100 gallons of water together with 2 pounds per 100 gallons of Buffer-X. Improved boll worm control was obtained consistently when the Buffer-X was used in combination with the Sevin Sprayable as just described. Residual action of the Sevin Sprayable was increased considerably.

*Example III.*—When 1 pound per 100 gallons of water of the commercial compounded insecticide known as Dylox, having as its active ingredient O,O-dimethyl 2,2,2-trichloro-1-hydroxyethyl phosphonate was used together with 2 pounds per 100 gallons Buffer-X, a mixture was formed which was tested against boll worms with results similar to those described in Example II above.

*Example IV.*—Fungicidal compositions were prepared respectively from 3 pounds N-trichloromethylmercapto-4-cyclohexene-1,2-diacarboximide (Captan) and 4 pounds Buffer-X per hundred gallons of water and 4 pounds zinc ethylenebisdithiocarbamate (Zineb) and 3 pounds Buffer-X per 100 gallons of water. Both Captan and Zineb are compounded commercial preparations containing dispersants for the active ingredient. The resultant compositions showed improved and sustained action against such pathogens as *Rhizoctonia solani* as well as against other fungus such as *Aspergillus niger*.

*Example V.*—Acaricidal mixtures were prepared from 1 pound 2,4,5,4'-tetrachlorodiphenyl sulphone (Tedion) together with 2 pounds Buffer-X per 100 gallons of water and from 3 pounds 2(p-tert.-butylphenoxy)isopropyl-2-chloroethyl sulfite (Aramite) together with 2 pounds Buffer-X. Tedion and Aramite are compounded commercial preparations containing dispersants for the active ingredient.

When these compositions were tested against European red mite and two-spotted mite, improved control was observed over that obtainable where the buffering and water conditioning agent of this invention was not present.

*Example VI.*—Herbicidal compositions were prepared utilizing, respectively, 4 and 8 pounds Buffer-X with 7 pounds 3-(3,4-dichlorophenyl)-1,1-dimethyl urea (Diuron) per 100 gallons water. Diuron is a compounded commercial preparation. When tested against Johnson grass, cocklebur, tules, cattails and Bermuda grass, the compositions showed improved effect in both pre-emergence and post-emergence tests over the results obtained where the buffering agent of this invention was omitted.

*Example VII.*—Although it has been long recognized as desirable, it has heretofore been impossible to combine low volatile esters of 2,4D(2,4-dichlorophenoxyacetic acid) with liquid fertilizers since they are incompatible and form a precipitate. It has been found that Buffer-X renders these materials compatible, i.e., mutually soluble. Various fertilizer solutions including 21% nitrogen solutions (as ammonium nitrate), 32% nitrogen solutions (as urea), and various complete fertilizers having ratios 15–5–5, 10–5–10, 5–6–12 and 9–9–9 (fertilizer solutions containing these percentages of nitrogen, phosphorus and potassium, respectively) have been combined with commercial preparations containing low volatile esters of 2,4D as the active ingredient. In each instance a 1% concentration of the 2,4D ester was achieved utilizing from 0.25% to 1.0% Buffer-X.

Obviously, many modifications and variations may be made without departing from the spirit and scope of this invention, and therefore only such limitations should be imposed as are indicated in the appended claims.

I claim:

1. A diluted, agricultural spray comprising a compounded, concentrated insecticide which contains wetting and dispersing agents and an aqueous dispersion containing from 1 to 8 pounds per 100 gallons of water of a mixture containing: between about 30 and 50 weight percent of a mixture of mono and di-orthophosphoric acid esters of nonyl phenoxy polyoxyethylene glycol having 9–10 moles of ethylene oxide, between about 5 and 20 weight percent of a nonyl phenoxy polyoxyethylene glycol having 9–10 moles of ethylene oxide, between about 1 and 3 weight percent orthophosphoric acid, between about 15 and 25 weight percent isopropyl alcohol, between about 18 and 29 weight percent water and between about 1 and 3 weight percent oleic acid, said dispersion having a pH of from 5.5 to 6.5.

2. A diluted, agricultural spray comprising a compounded, concentrated herbicide which contains wetting and dispersing agents and an aqueous dispersion containing from 1 to 8 pounds per 100 gallons of water of a mixture containing: between about 30 and 50 weight percent of a mixture of mono and di-orthophosphoric acid esters of nonyl phenoxy polyoxyethylene glycol having 9–10 moles of ethylene oxide, between about 5 and 20 weight percent of a nonyl phenoxyethylene glycol having 9–10 moles of ethylene oxide, between about 1 and 3 weight percent orthophosphoric acid, between about 15 and 25 weight percent isopropyl alcohol, between about 18 and 29 weight percent water and between about 1 and 3 weight percent oleic acid, said dispersion having a pH of from 5.5 to 6.5.

References Cited by the Examiner

UNITED STATES PATENTS

| | | | |
|---|---|---|---|
| 2,845,380 | 7/1958 | Mayhew et al. | 167—42 |
| 2,937,969 | 5/1960 | Bruce | 167—13 |
| 2,992,160 | 9/1962 | Lemin et al. | 167—42 X |
| 3,055,802 | 9/1962 | Lyons | 167—42 |

OTHER REFERENCES

Frear: Pesticide Index, College Science Publishers State College, Pa. (1961), pp. 35, 37, 38, 100, 139, 175, 181 and 188, 189.

Hackh's Chemical Dictionary, The Blakiston Co., Philadelphia (1944) pp. 146–147.

JULIAN S. LEVITT, *Primary Examiner.*